(12) United States Patent
Clarke

(10) Patent No.: US 6,920,496 B2
(45) Date of Patent: *Jul. 19, 2005

(54) NETWORK COMMUNICATION SYSTEM FOR PROVIDING A USER WITH A PAGING MESSAGE

(75) Inventor: Paul A. Clarke, Burgess Hill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 483 days.

This patent is subject to a terminal disclaimer.

(21) Appl. No.: 10/061,180

(22) Filed: Feb. 1, 2002

(65) Prior Publication Data

US 2002/0087691 A1 Jul. 4, 2002

Related U.S. Application Data

(63) Continuation of application No. 09/079,559, filed on May 15, 1998.

(30) Foreign Application Priority Data

Jun. 20, 1997 (GB) .............................................. 9712895

(51) Int. Cl.[7] ......................... G06F 15/173; G06F 15/16
(52) U.S. Cl. ....................................... 709/225; 709/250
(58) Field of Search ................................ 709/225, 250, 709/220, 224, 226, 232, 228; 379/93.23

(56) References Cited

U.S. PATENT DOCUMENTS

| | | | |
|---|---|---|---|
| 4,837,798 A | * 6/1989 | Cohen et al. | 379/88.14 |
| 5,724,412 A | 3/1998 | Srinivasan | 379/93 |
| 5,778,178 A | 7/1998 | Arunachalem | 709/203 |
| 5,944,785 A | 8/1999 | Pommier et al. | 709/205 |
| 5,944,786 A | 8/1999 | Quinn | 709/206 |
| 5,956,509 A | 9/1999 | Kevner | 395/684 |
| 6,058,179 A | 5/2000 | Shaffer et al. | 379/220 |
| 6,226,678 B1 | * 5/2001 | Mattaway et al. | 709/230 |
| 6,397,250 B1 | * 5/2002 | Clarke | 709/225 |

FOREIGN PATENT DOCUMENTS

| | | |
|---|---|---|
| EP | 0718784 | 6/1996 |
| EP | 0732660 A1 | 9/1996 |
| NL | C1004167 | 9/1997 |
| WO | WO9709681 | 3/1997 |
| WO | WO9709682 | 3/1997 |

* cited by examiner

Primary Examiner—Larry D. Donaghue
(74) Attorney, Agent, or Firm—Gregory L. Thorne

(57) ABSTRACT

A network communications system comprises a number of user stations, coupled via a data network to a number of service provider host systems. The user stations are registered as client stations at the host system of a service provider, with the host system maintaining a database of registered client station identification data. The host system additionally maintains a directory of the client stations that are on-line at a given time, determined from periodic messages sent to the host by each client station. Callers wishing to contact a client station (10) user first contact the service provider which, from the directory, determines whether the user is currently on-line. If so, a paging message is generated by the service provider from data supplied by the caller and sent via the network to the client station, the address of which is held in the service provider database.

16 Claims, 7 Drawing Sheets

NETWORK COMMUNICATION SYSTEM FOR PROVIDING A USER WITH A PAGING MESSAGE

This is a continuation of Application No. 09/079,559, filed May 15, 1998.

FIELD OF THE INVENTION

The present invention relates to user access systems and service provider host systems for data and service networks, particularly but not exclusively for use with the Internet/World Wide Web, and to means for initiating communications with a user when on-line.

BACKGROUND OF THE INVENTION

Recent years have seen a rapid increase in the amount of data available to a user via data network coupling to remote server, with cheap browser packages for home personal computer (PC) users and dedicated (and cheaper) access mechanisms such as WebTV greatly increasing the number of people on-line. A number of examples of network access and server systems, whether for the Internet or on a smaller local area network (LAN), are described in the introduction to EP-A-0 732 660 (Kambayashi et al/Toshiba) which relates to a mechanism for providing a degree of personalisation in service provision.

In the system described, a number of client systems (for example home users) are enabled to access, via network, data stored by a server. Each of these users is registered with the server having provided to it certain personal details such as an e-mail address and/or telephone number and optionally also a photograph. In operation, when a user is accessing a particular store or field of data held by the server, the server provides to the user a list of those other users concurrently accessing the data, perhaps providing an on-screen display of the photographs of those registered users.

As the number of people using networks such as the Internet continues to grow, so the extended use of individual telephone lines will create more problems. If a person is on-line then others cannot call them and even other on-line users cannot communicate in an immediate way using the Internet unless both parties go to a dedicated "chat space"—a host environment where messages may be exchanged. E-mail has been found to have problems with reliability and speed and, in view of the increasing volumes of electronic "junk mail" users are receiving, there is no guarantee that a message will be read once received.

The main difficulty with communication between two or more concurrently on-line users on such as the Internet is that if they make use of a dial-up connection then their Internet Protocol (IP) address—the numeric address that addresses each packet—will be different each time they connect. Specially written or modified chat software will not be able to handle the establishing of a link as one on-line person does not know the IP address of another for dial-up accounts on many Internet service providers.

It is therefore an object of the present invention to provide a means by which on-line users may be alerted to someone attempting to contact them.

SUMMARY OF THE INVENTION

In accordance with a first aspect of the present invention there is provided a network communications system comprising a plurality of user stations, each comprising respective processing and display means, and a plurality of service provider host systems coupled via a data network, wherein at least some of the user stations are registered as client stations with a first service provider host system, said host system including storage means maintaining a database of registered client station identification data; characterised in that each client station is configured to periodically identify to said host system, via the data network, when it is on-line; said host system is arranged to maintain an indication of those client stations on-line and includes means for, on receipt of data identifying a client station and additional data specifying a message, formatting a paging message and transmitting it via the network to the identified client station; each client station being configured to, on receipt of a paging message via the data network, generate an on-screen indication of receipt to the user and, in response to a predetermined command of the user, repeat the message.

By the provision of a service provider host system maintaining a list of those users currently on-line, a base location is effectively provided from which messages may be sent to the user (whose IP address would otherwise be unknown). Not only is this of benefit to the third party trying to contact an on-line user, but also to the users themselves who might otherwise worry about the length of time for which their telephone or other on-line connection is engaged.

On registration of a new client station, the host system may be arranged to generate a digital password (and optionally also a UserID), transmit the password to the new client station via the data network, and store the password with details of the new client station within the database. With such an arrangement, the periodic identification sent by a client station to the host system could suitably include an identifier for that client system and/or the password assigned by the host system. Making use of the periodic messages, the host system may suitably comprise timing means for maintaining in the directory an indication of when last each on-line client station contacted the server. With such timing means, the host may further comprise means coupled with the directory and operable to remove therefrom those client stations that do not contact the server within a predetermined period.

At the client system, which may comprise a suitably configured data network browser, the arrival of a paging message may be indicated to the user by display of an on-screen icon or message. To give a degree of flexibility to the user, user-operable selection means may be provided coupled with menu generation means arranged to generate a display of available icons from which the user may select one to be used by the browser to indicate the receipt of a message.

The client station is preferably configured to display the message in user-readable form in response to a predetermined command of the user, which command might be typed in via a users keyboard or simply a point and select operation on the displayed icon. To provide feedback to the originator of a received message, a client station may include means operable to send via the data network an acknowledge signal in response to a further user command and following receipt of a message to be acknowledged. This acknowledgment may be sent automatically when the user calls up the received message to view, or it may require a specific command of the user.

In an alternative to displaying the text of paging messages, the host system may include means operable to digitise audio data segments and transmit the same as part of a paging message, with one or more of the client stations then including means arranged to recreate the audio segments and play the same to a user in response to the a predetermined command or operation of the user.

The present invention also provides a data network browser configured as a user station, and a network server for use as service provider host system, for the above-described network communications system and as defined the claims attached hereto, to which the readers attention is now directed.

BRIEF DESCRIPTION OF THE DRAWINGS

Further features and advantages of the present invention will become apparent from reading of the following description of preferred embodiments of the present invention, given by way of example only and with reference to the accompanying drawings in which.

DETAILED DESCRIPTION OF THE INVENTION

Figure 1:
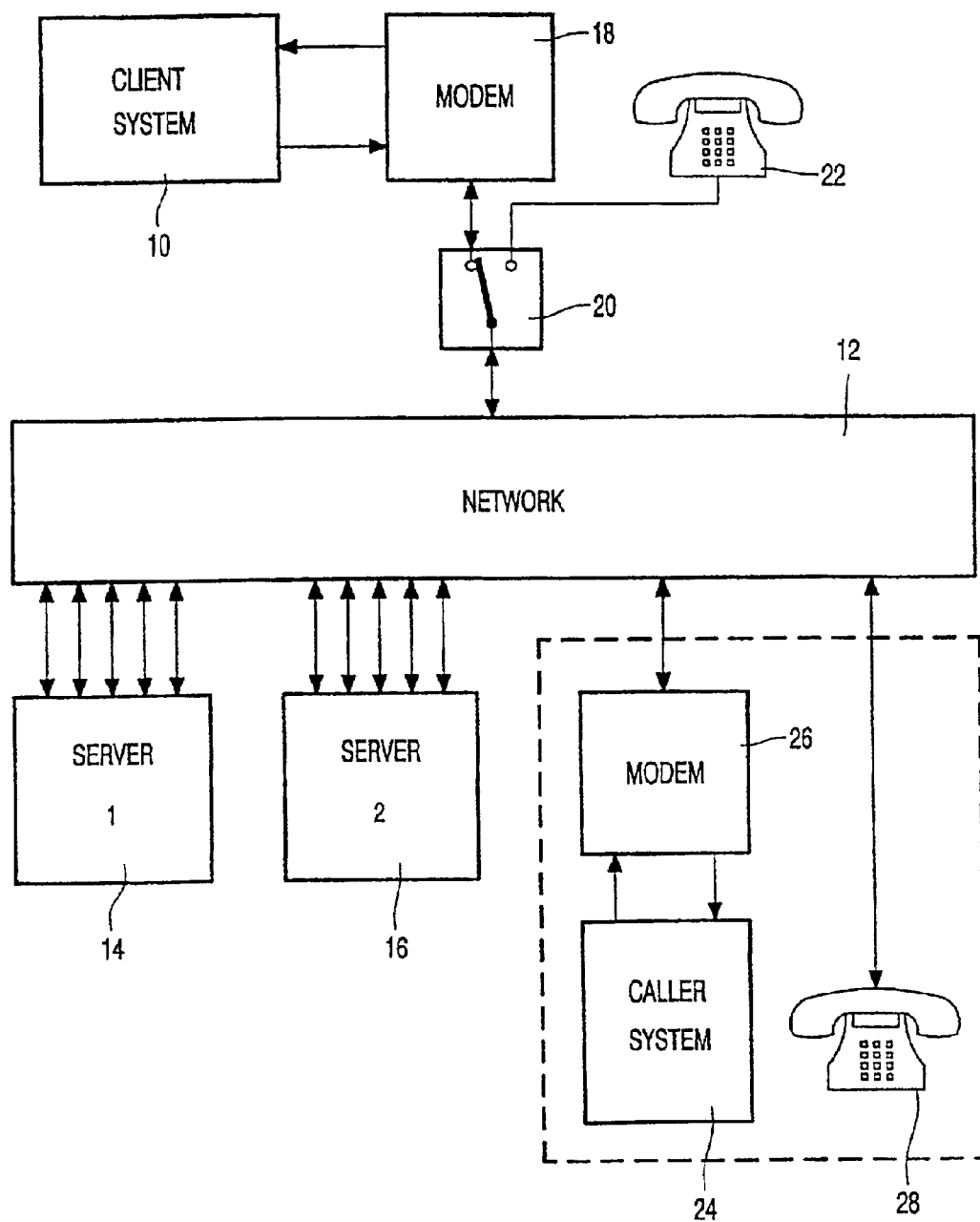
FIG. 1 is a block schematic diagram of a first system configuration embodying the present invention.

A first exemplary system configuration is illustrated in FIG. 1, and comprises a client computer system 10 having means to access, via a telephone network 12, one or more remote servers 14, 16 providing data from respective service providers. As shown, the access means for the client system 10 comprises a modem 18 linked to the network via a selector switch 20: operation of the selector switch 20 enables either the modem 18 or the users domestic telephone equipment 22 to use the single telephone line. It is this relatively common situation of a home user having only a single telephone line that is shared between the computer system 10 and the telephone equipment 22 which leads to the problem of other parties being unable to contact users by telephone for long periods of time whilst the users are engrossed in some on-line activity. A second user system 24 is shown in the Figure, again with a modem 26 for connecting to the network 12 but this second user has a second telephone line such that their telephone equipment 28 can remain connected and operational whilst they are on-line. The drawback to this arrangement is the cost of renting two telephone lines when one is effectively only used as back up when the other is in use.

In order to overcome the problem of a users telephone line being engaged for long periods of time, one of the servers 16 provides an on-line paging facility whereby registered clients of the facility are alerted when on-line (for example whilst logged on to a different server 14) to someone wishing to contact them via their single telephone line.

Figure 2:
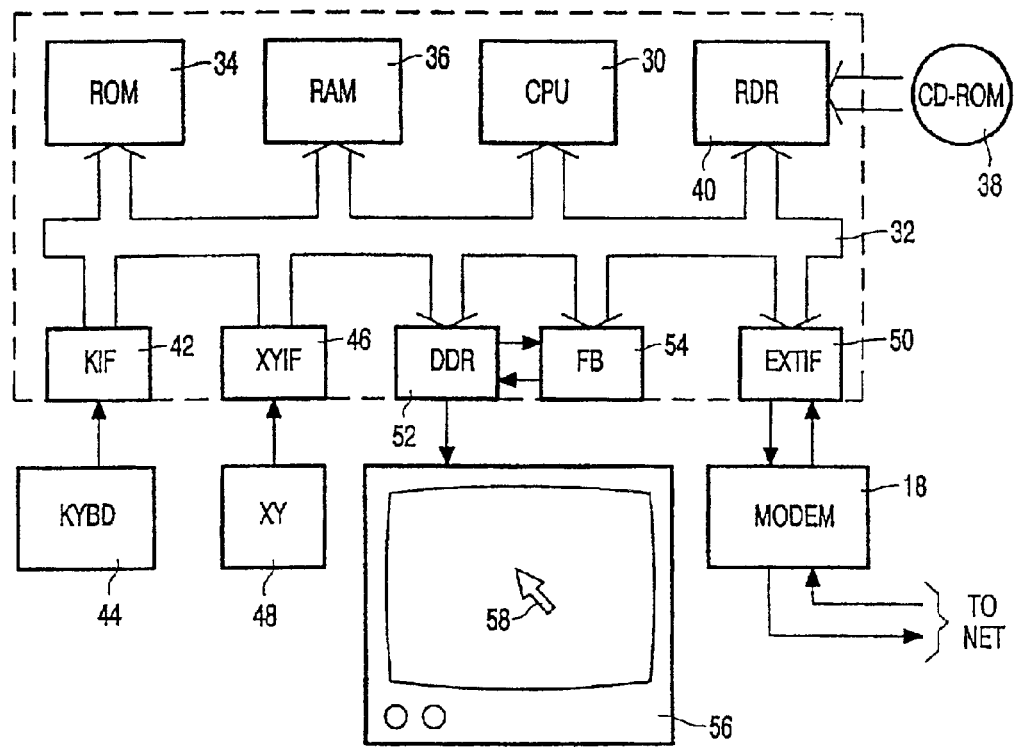
FIG. 2 is a block schematic representation of a user system architecture for use in the system of FIG. 1.

A typical client system, in the form of a personal computer (PC) hosting the client end of the paging facility, is shown in FIG. 2. The system comprises a central processor (CPU) 30 linked via an address and data bus 32 to non-volatile read-only memory (ROM) 34 and random access memory (RAM) 36. A further source of stored data may suitably be magnetic or optical disc such as CD-ROM 38 accessed by a suitable reader 40 controlled by the CPU via the bus 32. For connection of peripheral devices, a number of suitable interfaces are provided, again accessed via the bus 32. These interfaces include a keyboard interface 42 to receive signals from a conventional keyboard or keypad 44; a pointer interface 46 to receive two-dimensional (or optionally three-dimensional for some applications) movement signals from an XY pointer device such as a mouse or trackball 48; and an external interface 50 linking the data and address bus 32 to the modem 18. Also coupled with the bus are a display driver stage 52 and frame buffer 54, with the display driver calling up images assembled in the frame buffer for output to a display 56, such as a cathode-ray or liquid crystal display device. As illustrated, an on-screen cursor 58 is provided, with movement and selection being controlled via the mouse or trackball device 48.

Figure 3:
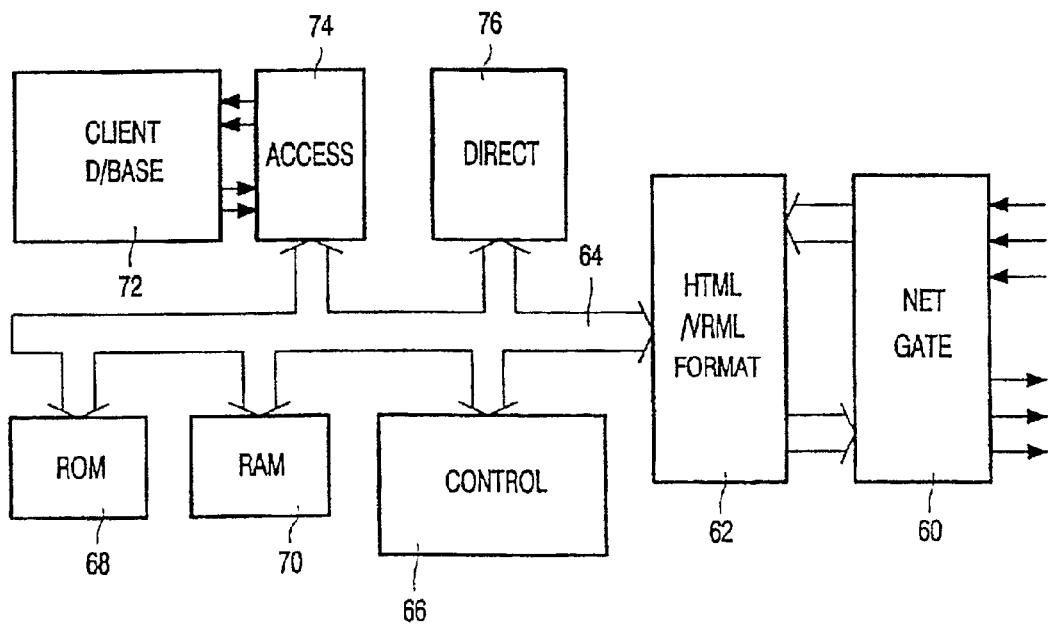
FIG. 3 schematically represents the architecture of a service provider server for use in the system of FIG. 1.

A suitable architecture for the server of the host system providing the paging facility is illustrated schematically in FIG. 3. From a gateway 60 to the network (12; FIG. 1), and via a data formatting stage 62 (differing data formats will be discussed in more detail hereinafter), a data and address bus 64 links to a main control and processing stage 66. Coupled with the control stage 66 via the bus 64 are operational memories ROM 68 and RAM 70. Two further storage means are provided, the first of which is a large capacity arrangement 72 holding data arranged into a database representing details of registered clients of the service. Access to the database is suitably handled by a dedicated stage 74 under the direction of the main control stage 66.

The second storage means 76, accessed via the bus 64, has a relatively smaller capacity than the database store 72 but much faster read/write cycle times: this second store 76 holds a directory of which of the registered clients of the system are on-line at any given time, based on periodic update messages received from each client. The update periodicity is standardised for the system as a whole, for example to once per minute: the store 76 includes an indication of the time that the last update was received from each client, and the control stage 66 is arranged to delete from the directory those entries for which an update has not been received for two or three minutes.

Figure 4:
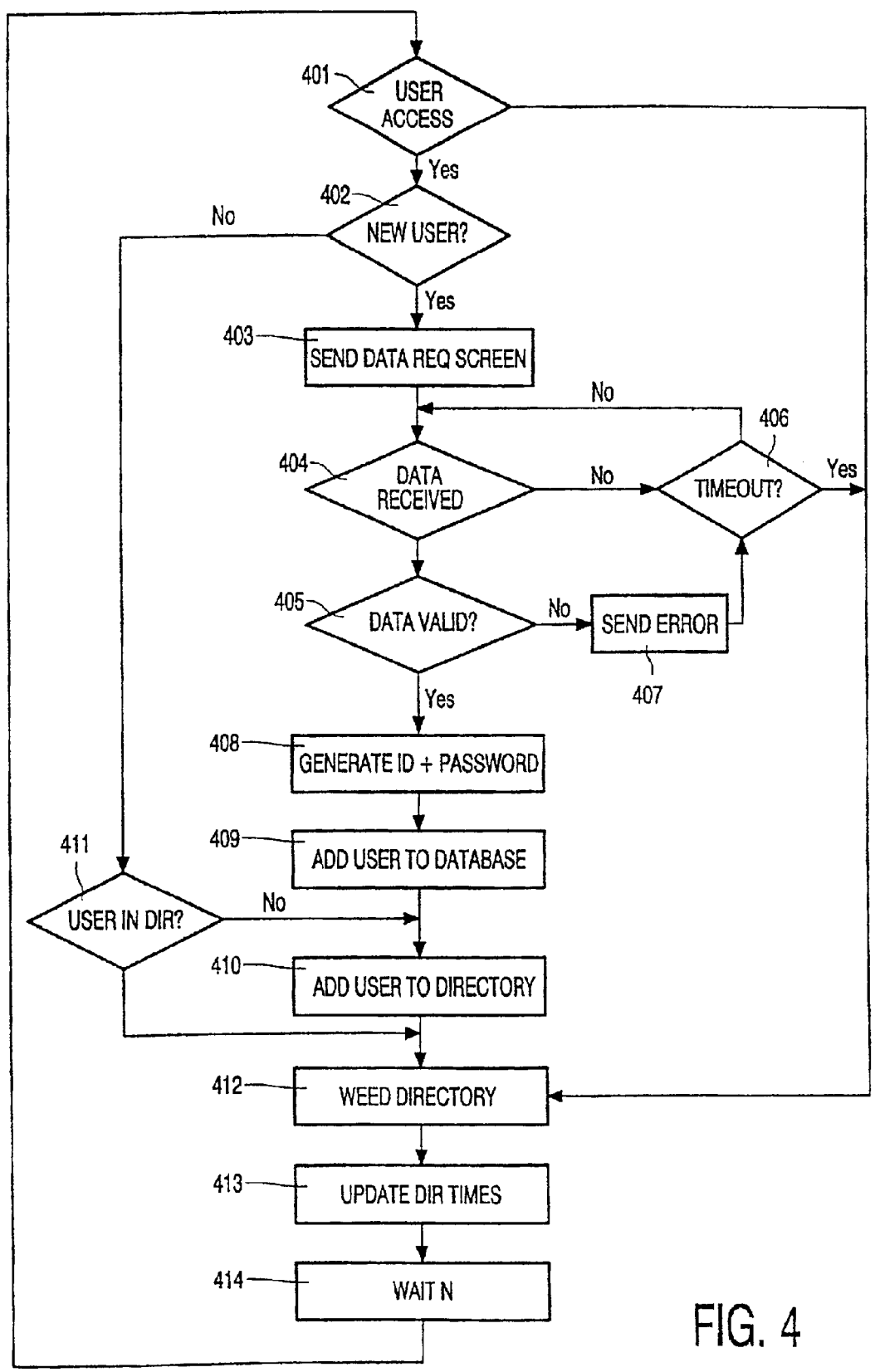
FIG. 4 is a flow chart representation of an initial registration procedure between a user and the service provider.

The procedure effected by the host server system of FIG. 3 in the registration of new clients and receiving of periodic updates from existing clients is illustrated by the flowchart of FIG. 4. The procedure is initiated at step 401 by the detection of a remote terminal accessing the server: in the absence of a detected access, the system carries out various housekeeping tasks, as will be described, before again checking for access.

Once a remote access has been detected at step 401, the next procedure is to determine (at step 402) whether the accessing station is an existing client of the system or whether it is a new user to be registered. If the accessing station does not provide a recognised ID and password within the access message, it is assumed to be a new client and the procedure passes to step 403 in which one or more data screens calling for information from the new user are sent to the accessing station. The required information will include the telephone number from which they are calling (and which is hence engaged at the time) together with an E-mail address and optionally credit card details if the service is not free.

At step 404 a check is made to see whether a response has been received to the sending of the data screens. If data has been received, the procedure moves to a validity check at step 405; if not, a countdown timer associated with the access procedure is checked (step 406) to see whether it has expired. If the countdown timer at step 406 has not expired, the system reverts to step 404 (optionally following a short delay) to again check for a response; if the timer has expired, the accessing procedure is terminated and the system reverts to its housekeeping procedures before returning to step 401 to check for a new access.

The validity check on the received data (step 405) might simply comprise a count of the number of digits in a telephone or credit card number or may be more detailed and rigorous. If it shows there to be an error in the received data, an error message will be generated and sent to the caller (step 407) following which the procedure moves back to the countdown timer check at step 406: if the timer has not expired, the new user will have a chance to re-send the data, otherwise the process terminates as before.

Having established at step 405 that the received data from the new user is valid, a user ID and password are generated at step 408 and E-mailed to the user: it is the presence or absence of this ID and password at step 402 which determines whether the accessing user is recognised as an existing (registered) client or whether they are treated as a new customer. Following sending of the ID and password, the new client details are loaded up in the hosts client database (72; FIG. 3) at step 409 and, because the client is assumed to be still on line, their ID is added to the directory of currently on-line users (76; FIG. 3) at step 410.

Returning briefly to step 402, if this determines that the accessing caller is an existing client (with details recorded in the database), the procedure moves to step 411 which checks whether or not they are currently in the directory, which is to say whether they are currently listed as on-line or whether they have just come on-line. If they are not already listed, the procedure moves to step 410 where they are added to the directory. If they are already listed at step 411, or following listing at step 410, or following expiry of the countdown timer at step 406, the procedure moves on to the housekeeping operations of steps 412 and 413.

At step 412, the directory entries are checked with reference to their respective last contact with the host: if this exceeds a predetermined period such as three minutes, the client is taken to be off-line and their entry removed from the directory. At step 413, the time entries for the remaining client identifiers in the directory are incremented. If the procedure is run at a fixed frequency, a variable wait may be introduced at step 414 before the procedure reverts to 401 to again check for user access.

Figure 5:
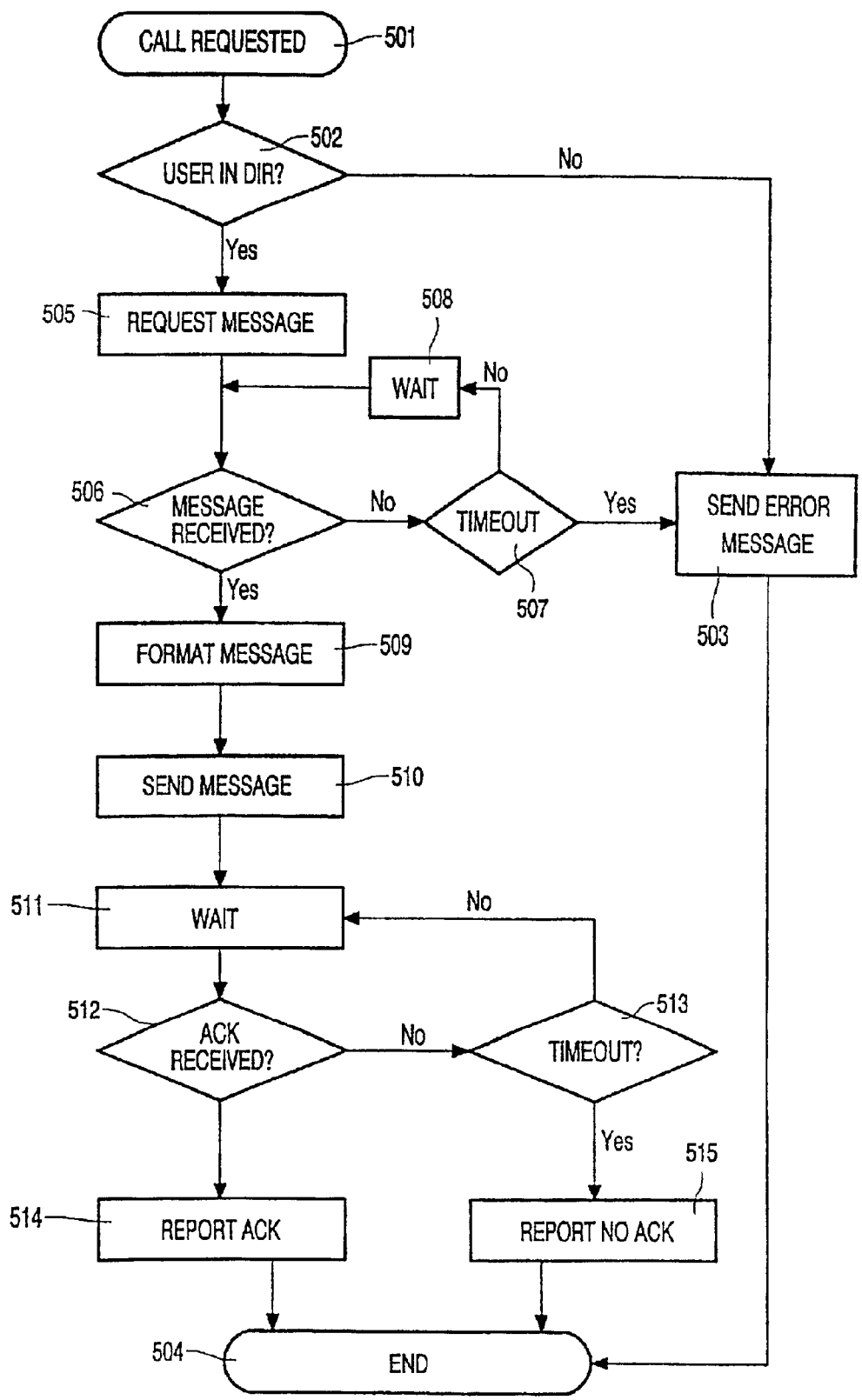
FIG. 5 is a flow chart representation of the procedure for generating and sending an on-line interrupt message to a registered user.

The procedure for handling the generation and sending of paging messages by the service provider host system will now be described with reference to the flowchart of FIG. 5. The procedure begins at step 501 with receipt of a request to send a message to a particular user. The user to be called may be identified by their system ID but more suitably by their (engaged) telephone number which will be held in the client database.

From receipt of the request to send, the next check (step 502) is whether the identified client is listed in the directory, that is to say whether it is currently on-line. If step 502 is negative, the host generates and sends (step 503) an error message appropriate to the channel by which the request was received, following which the procedure terminates at step 504. If the check of step 502 shows the identified client to be listed as on-line, the host system will then request the caller to specify the message they wish forwarded at step 505.

Having requested the message from the caller, the system enters a waiting loop comprising a check for receipt of a message (step 506), a check as to whether a countdown clock associated with the request has expired (step 507) and a short wait (step 508) before repeating the check of step 506. If the countdown timer at step 507 expires before a message is received, the procedure diverts to step 503, namely the generation of an error message (not necessarily the same as that following failure at step 502) followed by termination of the procedure.

Once a message has been detected as received by step 506, the host system will format it (step 509) according to the communications channel to be used and with reference to any constraints or particular settings of the clients system logged with the client data in the database, then send it to the identified client, at step 510. If the client system supports an acknowledgment protocol for the paging messages, the procedure will continue at step 511 (waiting for receipt of the acknowledgement), otherwise it will proceed directly to step 504 (termination). The wait state at step 511 is part of a further wait loop, also including a check for receipt of the acknowledgement from the client at step 512 and a countdown timer at 513 limiting the maximum time the system will wait for a response. Depending on whether or not an acknowledgement is received within the time set, the system will respond to the caller with a report of either the success (step 514) or failure (step 515) of the acknowledge, before the procedure terminates at step 504.

Figure 6:
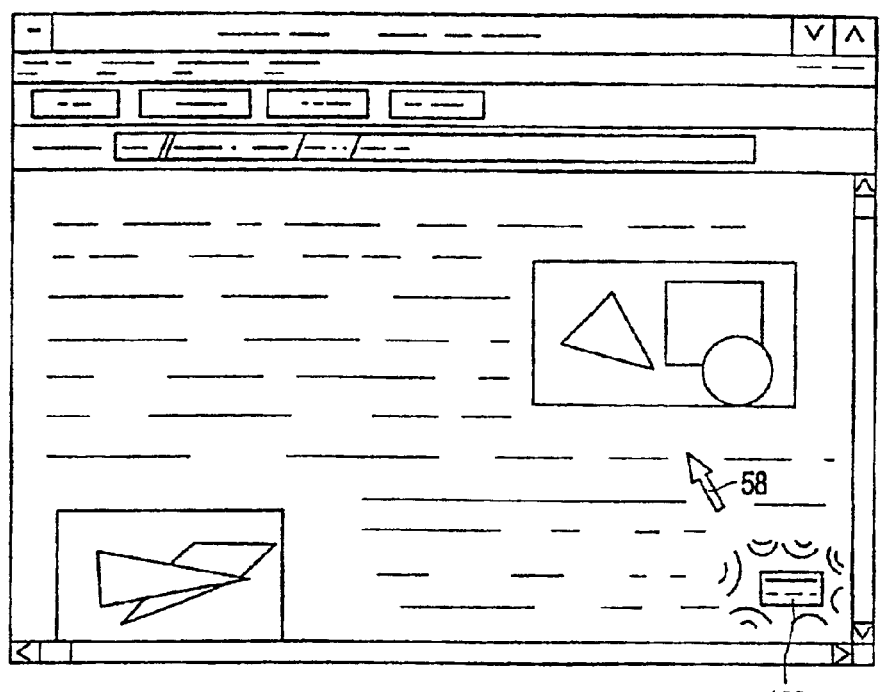
FIGS. 6 to 9 represent screen displays seen at the users machine following a message arrival.
Figure 7:
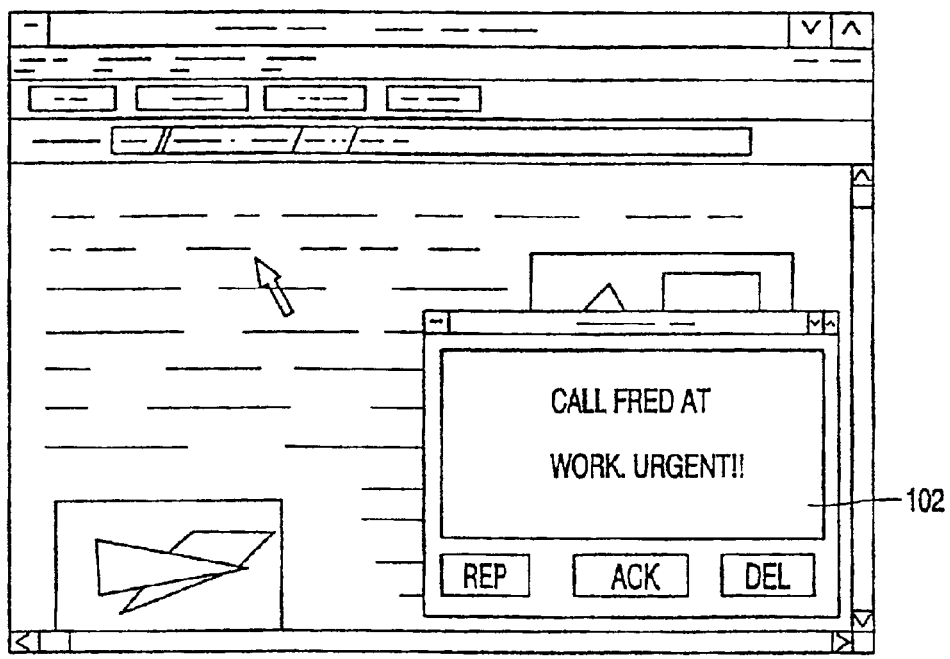

FIGS. 6 and 7 represent on-screen displays which may be seen by a user of a client system during receipt of a paging message. In FIG. 6, the user is browsing through text and graphics in a window interface: the cursor 58 may be used to operate scrolling bars, activate links and so forth as will be familiar to the average user. On receipt of a paging message, the client system calls a preselected icon 100 from storage and intermittently loads it into the frame buffer (54; FIG. 2) such that it flashes on the screen to alert the user to receipt of the message. If the user wishes to see the message, they need simply position the cursor 58 over the icon 100 and select (using XY controller 48; FIG. 2) following which the icon 100 is replaced by a text window 102 as shown in FIG. 7. This text window may contain one or more control switches as shown in addition to the message text. These buttons would suitably give the user the opportunity to reply by typing his own text in the window 102 (although this button will be disabled if the service provider does not indicate that the caller can accept a reply), to simply acknowledge receipt of the message (as at steps 511–515 of FIG. 5) or to delete the message.

The form of the icon 100 and whether or not it flashes to attract a users attention, and the arrangement of the text window 102 are suitably provided as set-up choices to the user, with the source of the pager message handling software suitably also including menus of display options to accompany the operation.

Figure 8:
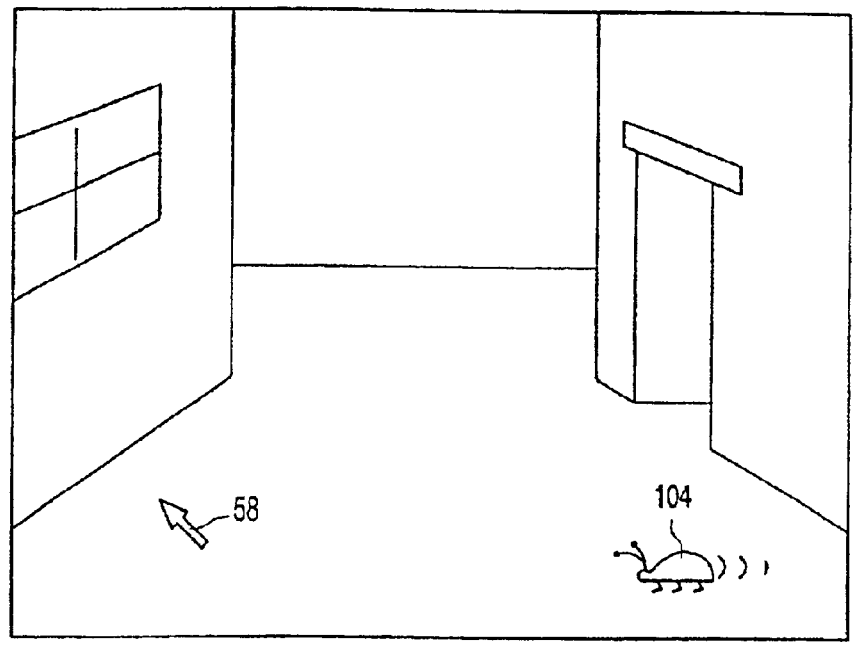
Figure 9:
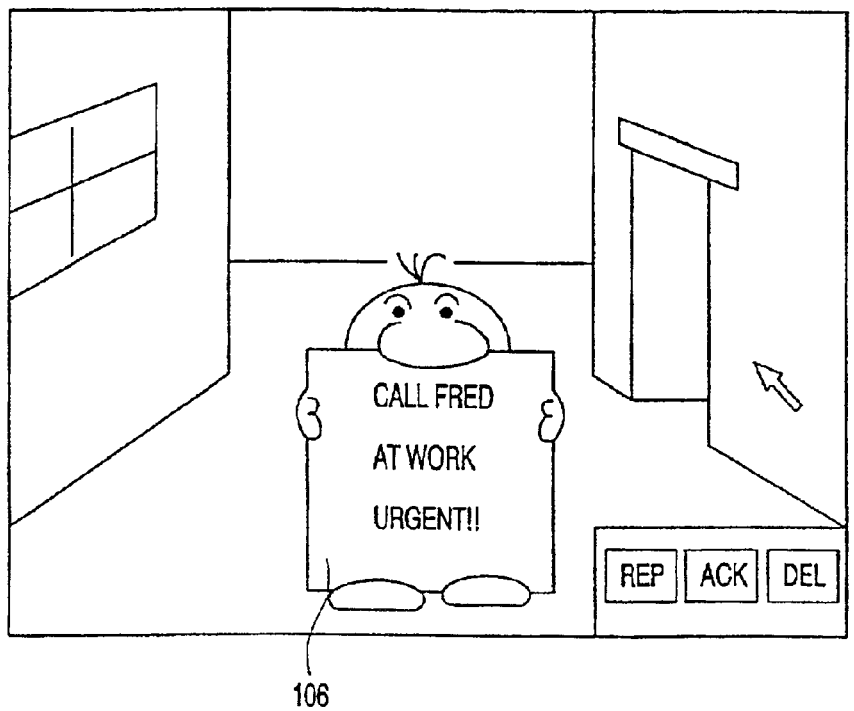

An alternative screen display is illustrated in FIGS. 8 and 9, representing a two-dimensional view, as presented by a user, who is navigating a three-dimensional virtual environment based on data from a remote service provider. An example of standardisation in the field of data defining such virtual environments is the so-called Virtual Reality Modelling Language (VRML) as described, for example, in the VRML standard, version 2.0, issued as ISO/IEC WD14772 on 4th Aug. 1996. VRML is a file format for describing interactive three-dimensional objects and worlds to be experienced on the Internet/World Wide Web and it is generally analogous to the way HTML (HyperText Markup Language)

is used to describe documents, such as the data being browsed in the example of FIGS. 6 and 7, for transmission over the Internet. In the three-dimensional scenario, the simple two-dimensional icon from FIG. 6 may be replaced by a three-dimensional animated character such as the beetle 104 in FIG. 8. The movements of the beetle are pre-scripted and stored in the client system and need simply be sequentially loaded into the frame buffer at run time. As before, the user has a cursor 58 by means of which objects within the virtual environment displayed may be selected or manipulated: in this instance, clicking on the beetle will lead to display of the text of the received message, perhaps as shown in FIG. 9 by another animated creature 106 which either simply replaces or metamorphoses from the beetle.

Figure 10:
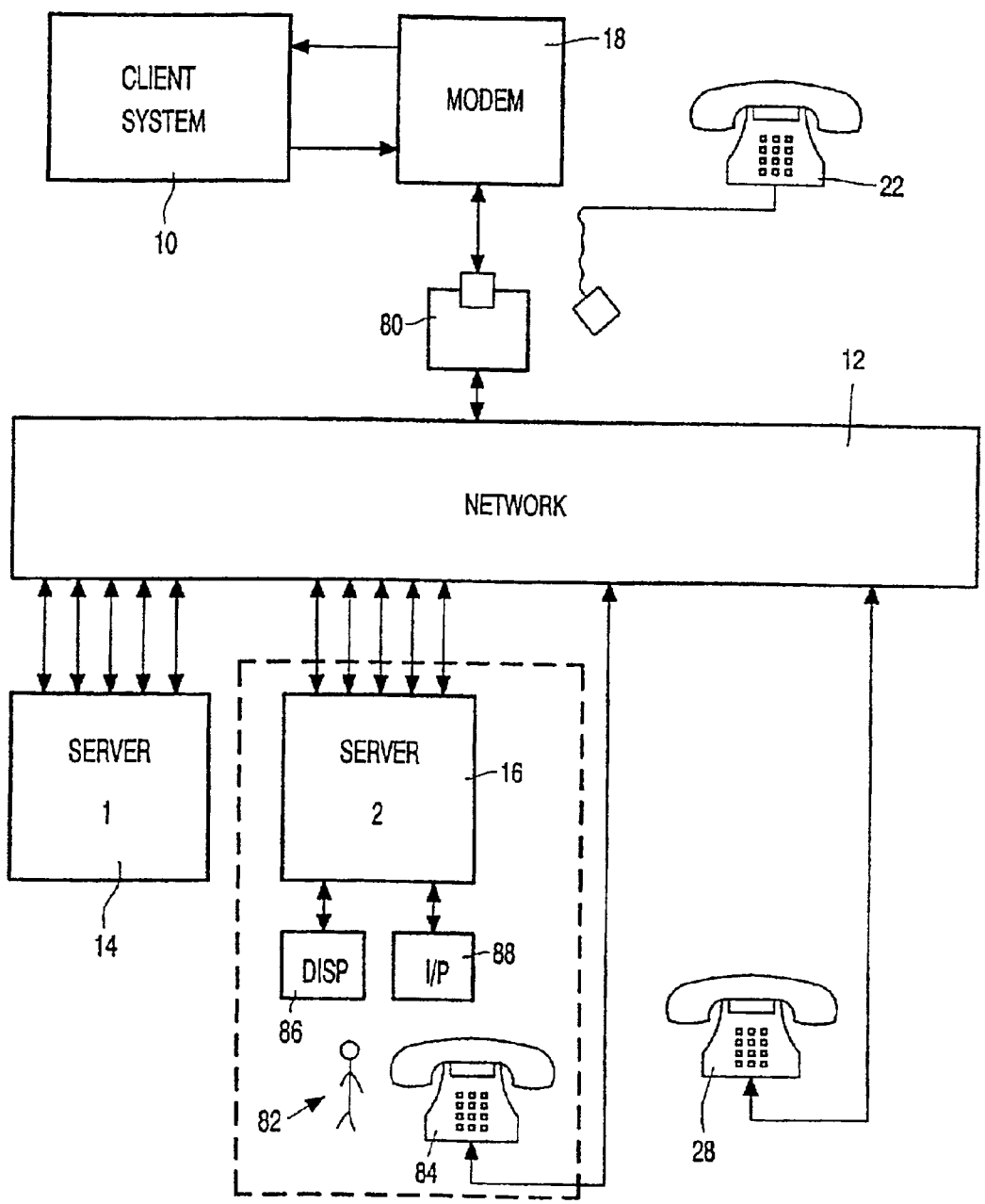
FIG. 10 is a block schematic diagram, as FIG. 1, of an alternative system configuration embodying the present invention.

From reading the present disclosure, other modifications will be apparent to persons skilled in the art. Such modifications, whilst remaining within the scope of the following claims, may involve other features which are already known in the design, manufacture and use of data transmission and presentation systems, display apparatuses and component parts thereof and which may be used instead of or in addition to features already described herein. Some of these modifications or variations are illustrated in FIG. 10, which otherwise corresponds to FIG. 1 in a number of details (for which the same reference numerals have been used), which features will not be again described. Apart from the replacement of the users selector switch with a simple socket 80, the principle change is to provide for callers having only a telephone 28, without a network browser system. For such a case, the service provider may provide one or more human operators 82 who receive the caller requests by telephone 84, check whether the client is on-line and, if so, manually enter the message for transmission via display 86 and data input 88 means.

An alternative and automated arrangement requires the caller to have a touch tone telephone: after dialling up a connection to the server 16, the user then enters their own telephone number and the number they are trying to contact (the number of client 10). The server compares the requested number against the current directory of on-line clients and, if there is a match, sends a paging message such as "Telephone No. 0123 456 789 Called". In a further alternative arrangement, the server records short (10–20 second) voice mail messages from the caller.

Although claims have been formulated in this application to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same the technical problems as does the present invention. The applicants hereby give notice that new claims may be formulated to such features and/or combinations of features during the prosecution of the present application or of any further application derived therefrom.

What is claimed is:

1. A program portion stored on at least one processor readable medium for providing communication within a network communications system comprising a plurality of user stations and a service provider host system, wherein at least some of the user stations are registered as client stations with the host system, the program portion comprising:
   a program segment for periodically identifying each on-line client station to the host system;
   a program segment for maintaining an indication of those client stations on-line;
   a program segment for formatting a paging message at the host system on receipt of data identifying a client station and additional data specifying a message, the program segment formatting the paging message such that an indication of receipt is generated upon receipt of the paging message at the identified client station; and
   a program segment for transmitting the paging message to the identified client station.

2. The program portion of claim 1, wherein the paging message is formatted to generate an on-screen indication of the receipt to a user.

3. The program portion of claim 1, wherein the paging message is formatted to repeat the message in response to a predetermined command of the user.

4. The program portion of claim 1, comprising:
   a program segment for generating a password on registration of a new client station; and
   a program segment for transmitting the password to the new client station.

5. The program portion of claim 1, wherein the program segment for periodically identifying each on-line client station to the host system includes a program segment for determining if the client station transmits an identifier for the client station and a corresponding password.

6. The program portion of claim 3, comprising a program segment for receiving an acknowledge signal after the message is repeated at the identified client station.

7. The program portion of claim 6, comprising a program segment for forwarding the acknowledgment signal to the client station that sent the message.

8. The program portion of claim 1, comprising:
   a program segment for determining when last each on-line client station was identified by the host system; and
   a program segment for deleting said indication for those client stations that are not identified by the host system within a predetermined period.

9. A method for providing communication within a network communications system comprising a plurality of user stations and a service provider host system, wherein at least some of the user stations are registered as client stations with the host system, the method comprising the acts of:
   identifying periodically each on-line client station to the host system;
   maintaining an indication of the on-line client stations;
   formatting a paging message at the host system on receipt of data identifying a client station and additional data specifying a message, the formatting such that an indication of receipt is generated upon receipt of the paging message at the identified client station; and
   transmitting the paging message to the identified client station.

10. The method of claim 9, wherein the paging message is formatted to generate an on-screen indication of the receipt to a user.

11. The method of claim 9, wherein the paging message is formatted to repeat the message in response to a predetermined command of the user.

12. The method of claim 9, comprising the acts of:
   generating a password on registration of a new client station; and
   transmitting the password to the new client station.

13. The method of claim 9, wherein identifying periodically each on-line client station to the host system comprises the act of determining that the client system transmits an identifier for the client system and a corresponding password.

14. The method of claim 11, comprising the act of receiving an acknowledge signal after the message is repeated at the identified client station.

15. The method of claim 14, comprising the act of forwarding the acknowledgment signal to the client station that sent the message.

16. The method of claim 9, comprising the acts of:

determining when last each on-line client station was identified by the host system; and deleting said indication for those client stations that are not identified by the host system within a predetermined period.

* * * * *